United States Patent [19]

Tamura

[11] Patent Number: 4,697,091
[45] Date of Patent: Sep. 29, 1987

[54] SLIP DETECTING DEVICE FOR A PRIME MOVER

[75] Inventor: Yasuji Tamura, Ojima, Japan

[73] Assignee: Sanden Corporation, Gunma, Japan

[21] Appl. No.: 752,066

[22] Filed: Jul. 5, 1985

[30] Foreign Application Priority Data

Jul. 5, 1984 [JP] Japan .......................... 59-100633[U]

[51] Int. Cl.$^4$ ............................................. B61C 15/08
[52] U.S. Cl. ......................................... 290/45; 290/3; 180/197; 318/52; 364/426; 73/507
[58] Field of Search ................ 290/3, 45; 318/52, 69, 318/146, 147, 268, 311, 713; 73/507, 530; 180/197; 364/426

[56] References Cited

U.S. PATENT DOCUMENTS

| 3,117,264 | 1/1964 | Smith ................................... | 290/3 X |
| 3,560,759 | 2/1971 | Buehler et al. ..................... | 318/52 X |
| 3,657,601 | 4/1972 | Darrow ............................... | 318/52 X |

Primary Examiner—Peter S. Wong
Assistant Examiner—Emanuel Todd Voeltz
Attorney, Agent, or Firm—Banner, Birch, McKie & Beckett

[57] ABSTRACT

A device for detecting when a driven apparatus has frozen and/or its prime mover coupling mechanism is slipping. The rotational speed of a voltage generating alternator which is also driven by the prime mover is detected and a corresponding speed signal is compared to a reference speed signal. The reference speed signal corresponds to a speed slightly lower than the idling speed of the prime mover. When the detected speed signal is lower than the reference speed signal, slippage in the prime mover coupling mechanism is presumed and a slippage signal is provided. The slippage signal is used to control the coupling mechanism to disengage the apparatus from the prime mover to prevent damage from occurring.

17 Claims, 9 Drawing Figures

SLIP DETECTING DEVICE FOR A PRIME MOVER

TECHNICAL FIELD

The present invention relates to the field of prime movers and apparatus which are driven by prime movers. More particularly, the invention is directed to a device for detecting when a driven apparatus has frozen and/or its prime mover coupling mechanism is slipping.

BACKGROUND OF THE INVENTION

Much of the machinery which has been developed over the years is driven by some form of prime mover. Thus efficient power transfer mechanisms are necessary for coupling the prime mover to the driven apparatus. Such power transfer mechanisms range from a simple pair of pulleys and a drive belt to rather complex gearing arrangements. Regardless of the design of the power transfer mechanism, slippage due to a frozen or sluggish driven apparatus usually results in damage to the power transfer mechanism and to the prime mover.

One example of an apparatus which must be coupled to a prime mover is the compressor used in automotive air conditioning systems. Such compressors are usually coupled to the automotive engine by a drive belt through an electromagnetic clutch. If the compressor should freeze (lock) or become difficult to turn while the clutch is engaged, the belt will slip. Slippage causes rapid wear and early breakage of the belt. In some situations, unexpected breakage of a drive belt could have serious results.

For the above reasons, there are systems known in the prior art which detect the rate of rotational speed of a prime mover and a driven apparatus for the purpose of determining whether there is slippage in the power transfer mechanism, for example, as shown in Japanese Patent Publication No. 57-35181. When slippage beyond a set amount is detected, the prime mover is shut down or the driven apparatus is disconnected from the prime mover. Because such devices must measure the rotational speed of both the prime mover and the driven apparatus and then calculate the rate of rotational speed for each, they are rather complicated in construction and quite expensive to manufacture.

SUMMARY OF THE INVENTION

It is therefore the overall object of the present invention to provide a device for detecting slippage in the power transfer mechanism of a prime mover and a driven apparatus which is simple in construction and economical to manufacture.

It is another object of the present invention to provide such a device which is easy to adjust and which is highly reliable in operation.

These and other objects are achieved in accordance with the present invention by a device which includes a rotational speed detector for the driven apparatus and a speed comparator coupled to the speed detector and a reference speed source for controlling engagement of the power transfer mechanism. The speed detector sends a voltage signal to the speed comparator which varies in accordance with the rotational speed of the driven apparatus. A reference speed voltage signal is also provided to the speed comparator. The reference speed voltage signal corresponds to a speed which is selected to be lower than the idling speed of the prime mover. The speed comparator compares the voltage signal from the speed detector to the reference speed voltage signal. If the voltage signal from the speed detector is lower than the reference speed voltage signal, the speed comparator provides an output signal indicating that the rotational speed of the driven apparatus is less than the idling speed of the prime mover. Such a signal indicates that there is slippage in the power transfer mechanism between the prime mover and the driven apparatus.

DETAILED DESCRIPTION OF THE PREFERRED EMBODIMENT

Figure 1A:
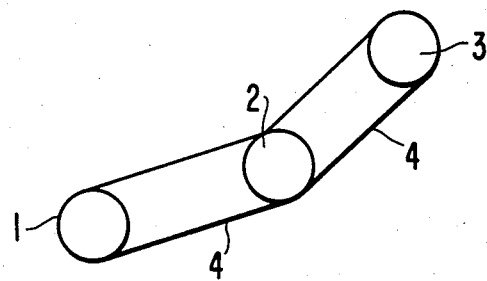
FIG. 1(a) is a schematic diagram of a belt drive system.

As shown in FIGS. 1(a) and (b), drive force is conveyed from an engine 1 to a compressor 2, an alternator 3 and other apparatus through belts 4. An electromagnetic clutch (not shown), which is mounted on compressor 2, is coupled between engine 1 and compressor 2 for controlling the application of power to compressor 2. Compressor 2 and alternator 3 rotate with engine 1 in synchronization.

Figure 2:
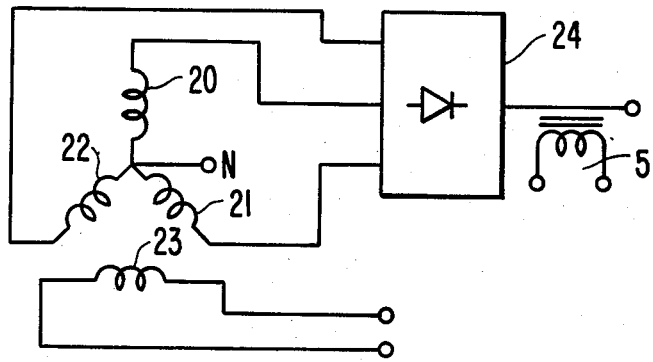
FIG. 2 is a circuit diagram illustrating a portion of an alternator.

As shown in FIG. 2, alternator 3 is comprised of windings 20, 21 and 22 which are arranged in three-phase Y connection and winding 23. Windings 20–22 are connected to rectifier circuit 24 which rectifies the three-phase alternating current from said windings. Since the output current from rectifier circuit 24 has a frequency which is proportioned to the rotational speed of alternator 3, the speed of alternator 3 can be detected by winding 5 shown in FIG. 2.

Figure 3A:
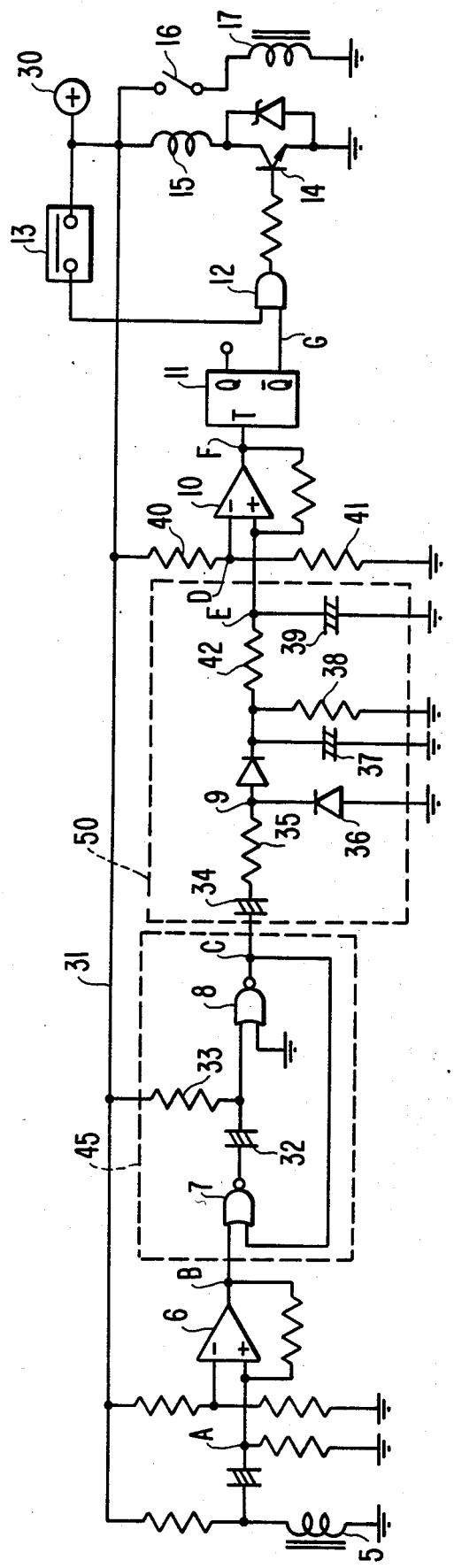
FIG. 3(a) is a circuit diagram illustrating one embodiment of the slip detecting device of the present invention.
Figure 3B:
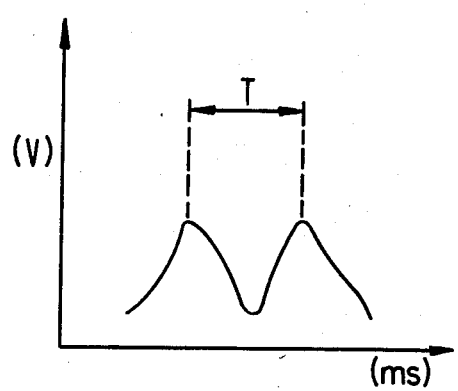
FIG. 3(b) is a graphical illustration of the voltage signal at point A in FIG. 3(a).
Figure 3C:
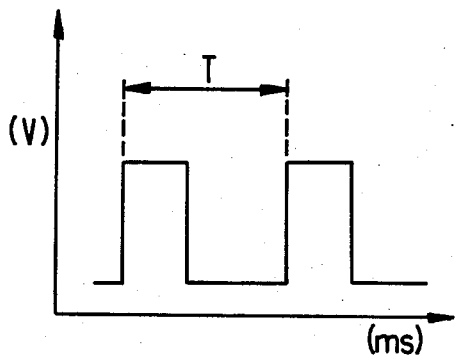
FIG. 3(c) is a graphical illustration of the voltage signal at point B in FIG. 3(a).

As shown in FIG. 3(a) winding 5 is connected to a comparator 6. When the voltage signal of time period T as shown in FIG. 3(b) is supplied from winding 5 to comparator 6, a voltage pulse of time period T as shown in FIG. 3(c) is supplied from the output terminal of comparator 6 (point B). The output of comparator 6 is connected to multi-vibrator circuit 45. Multivibrator 45 is comprised of NOR circuits 7 and 8. The output of comparator 6 is connected to one input of NOR circuit 7. The output of NOR circuit 7 is in turn connected to an input of NOR circuit 8 through a coupling network made up of capacitor 32 and resistor 33. The second input of NOR circuit 8 is connected to ground or the zero voltage reference potential. The output of NOR circuit 8 (i.e., the output of multi-vibrator 45 at point C) is connected in a feed-back path to the second input of NOR circuit 7.

Figure 1B:
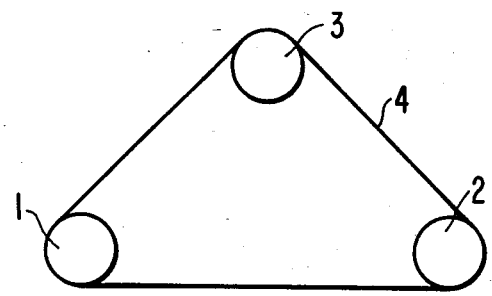
FIG. 1(b) is another schematic diagram of the a belt drive system.
Figure 3D:
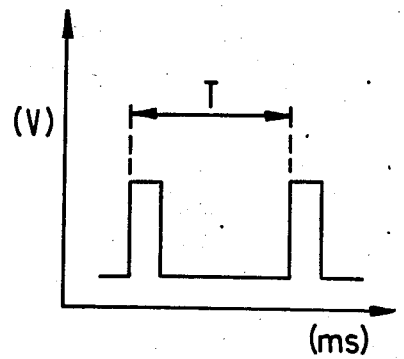
FIG. 3(d) is a graphical illustration of the voltage signal at point C in FIG. 3(a).

Multi-vibrator 45 provides additional waveform-shaping by comverting the pulse width of the output signals from comparator 6 to a standard pulse width as shown in FIG. 3(d) while maintaining time period T between each pulse. The output signals from multivibrator 45 are filtered by filter circuit 50 comprising capacitor 34, resistor 35, diode 36, diode 9, capacitor 37, resistor 38, resistor 42 and capacitor 39. The output voltage of filter circuit 50 varies in accordnce with time period T. Since time period T is proportional to the rotational speed of alternator 3 shown in FIG. 1, the output voltage of the filter circuit is also proportional to the rotational speed of alternator 3. When period T is short (rotational speed of the alternator is high), the output voltage of the filter circuit is high. On the other hand, when time period T is long (the rotational speed of the alternator is low), the output voltage of the filter circuit is low. Thus, the value of the voltage at point E shown in FIG. 3(a) continuously varies depending upon the rotational speed of the alternator, as shown in FIG. 3(e).

The output terminal of the filter circuit 50 is connected to the non-inverting (+) terminal of comparator 10. The inverting terminal (−) of comparator 10 is connected to a reference voltage provided by a voltage divider made up of resistors 40 and 41. The voltage for the voltage divider is supplied by power supply 30 to power line 31. The voltage from the voltage divider is adjusted by using appropriate values for resistors 40 and 41 to provide a voltage at the inverting input terminal of comparator 10 (point D) which is slightly lower than the voltage at point E shown in FIG. 3(a) when the prime mover (as for example an automobile engine) which drives the alternator is idling and there is no slippage condition in the power transfer mechanism. The voltage supplied from the voltage divider network to the inverting terminal of comparator 10 is hereafter referred to as $V_2$ while the voltage from point E shown in FIG. 3(a) and which is supplied to the non-inverting input terminal of comparator 10 is hereafter referred to as $V_1$. The output terminal of comparator 10 is connected to the T terminal of T-type flip-flop 11. The $\overline{Q}$ output terminal of T type flip-flop 11 is connected to one input of AND circuit 12. The other input of AND circuit 12 is coupled to power supply 30 through thermostat switch 13. The output terminal of AND circuit 12 is connected to the base electrode of transistor 14. The emitter electrode of transistor 14 is connected to ground or the zero reference potential. The collector electrode of transistor 14 is connected to relay coil 15 and provides a path to ground through transistor 14 when transistor 14 is in a conductive state.

Figure 3E:
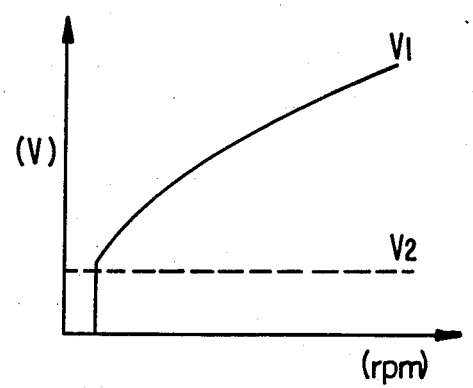
FIG. 3(e) is a graphical illustration of the relationship between the voltage signals at points D and E in FIG. 3(a).
Figure 3F:
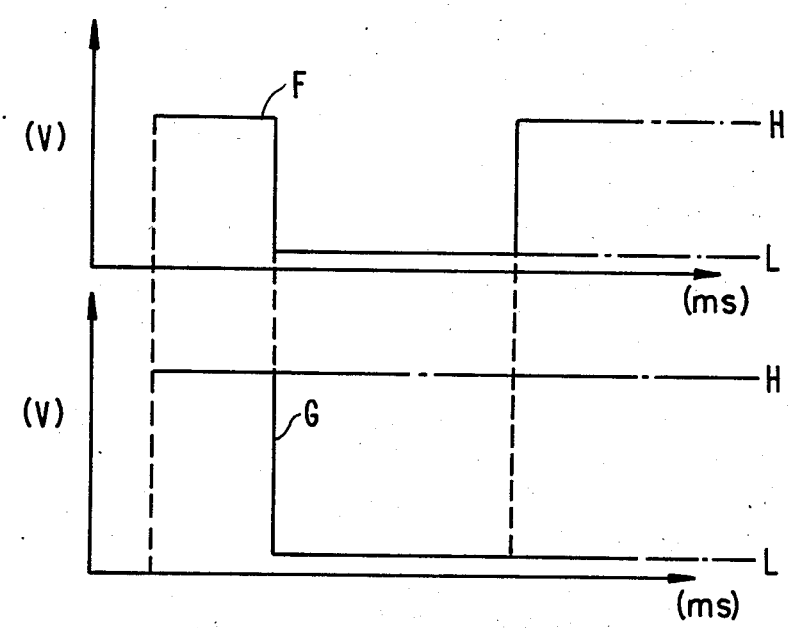
FIG. 3(f) is a graphical illustration of the voltage signals at points F and G in FIG. 3(a).

Thus, as shown in FIG. 3(e), when $V_1$ is higher than $V_2$, the output voltage level of comparator 10 is high. Thus, a logic high level is supplied to T type flip-flop 11. As shown in FIG. 3(f), the output voltage level of comparator 10 is high. Thus, a logic high level is supplied to T type flip-flop 11. As shown in FIG. 3(f), the output voltage level from the $\overline{Q}$ terminal of the T type flipflop is high in accordance with the voltage signal from comparator 10. when thermostat switch 13 is closed, a high voltage level is supplied to one input terminal of AND circuit 12. Therefore, the output voltage level of AND circuit 12 is high. Thus, transistor 14 is turned on and relay coil 15 closes relay contact 16 allowing current to flow through electromagnetic clutch 17. Thus, engine 1 is connected to the compressor 2 through electromagnetic clutch 17.

Where $V_1$ is less than $V_2$, the output voltage level from comparator 10 changes from high to low. Accordingly, as shown in FIG. 3(f), the output voltage level of the $\overline{Q}$ terminal of T type flip-flop 11 also changes to a low. Therefore, transistor 14 is turned off causing electromagnetic clutch 17 to disconnect the engine from the compressor.

Thus, in the present invention, when the rotational speed of the alternator (compressor) is less than the idling speed of the engine, a slipping condition is presumed and the electromagnetic clutch is deenergized so that the engine is disconnected from the drive shaft of the compressor.

This invention has been described in detail in connection with the preferred embodiments, but there are examples only and the invention is not restricted thereto. It will be easily understood, by those skilled in the art, that other variations and modifications can be easily made within the scope of this invention.

What is claimed is:

1. In an apparatus driven by a prime mover, a device for providing a slippage signal when slippage is present in the power transfer mechanism used to connect said apparatus to said prime mover, said prime mover also driving an alternator for generating a voltage, said device comprising:
   detecting means for detecting a voltage signal frequency which corresponds to the frequency of the output voltage of said alternator;
   reference signal means for providing a reference speed signal which corresponds to a speed less than the idling speed of said prime mover; and
   comparator means for receiving said voltage signal frequency and said reference speed signal, wherein said comparator means provides said slippage signal when said speed signal corresponding to said voltage signal frequency is less than said reference speed signal.

2. The device of claim 1 wherein said speed detecting means is a magnetic winding.

3. The device of claim 1 wherein said speed detecting means provides a plurality of voltage pulses, the period between each of said voltage pulses being dependent on the rotational speed of said alternator.

4. The device of claim 3 further comprising waveform-shaping means for shaping said voltage pulses to have a rapid rise time and a rapid fall time.

5. The device of claim 4 wherein said waveform-shaping means comprises first and second logic NOR gates coupled in cascade.

6. The device of claim 3 further comprising waveform-shaping means for shaping the waveform of said voltage pulses to a standard width while maintaining the original period between said voltage pulses.

7. The device of claim 6 wherein said waveform-shaping means comprises first and second logic NOR gates coupled in cascade.

8. The device of claim 3 further comprising filtering means for filtering said voltage pulses to provide an analogue voltage signal for said reception by said comparator.

9. The device of claim 1 further comprising means for disengaging said apparatus from said prime mover when said slippage signal is present.

10. The device of claim 1 wherein said power transfer mechanism includes an electromagnetic clutch for controlling the engagement of said apparatus with said prime mover, wherein said electromagnetic clutch is operated to disengage said apparatus from said prime mover when said slippage signal is present.

11. The device of claim 10 further comprising logic means for receiving said slippage signal and a clutch engagement signal, said logic means controlling said electromagnetic clutch to cause engagement of said apparatus with said prime mover only when said clutch engagement signal is present and said slippage signal is not present.

12. The device of claim 1 wherein said detecting means comprises:
   transducer means for receiving induced voltage pulses from said alternator;
   first wave-shaping means coupled to said transducer means for receiving said voltage pulses and shaping the waveform of said voltage pulses to have a rapid rise time and a rapid fall time and providing a corresponding output signal;
   second wave-shaping means coupled to said first wave-shaping means for shaping the waveform of the output signal from said first wave-shaping means to have a standard width and providing a corresponding output signal; and
   filter means coupled to said second wave-shaping means for filtering the output signal from said second wave-shaping means to provide said voltage signal frequency.

13. The device of claim 12 further including logic means coupled to said comparator means for processing said slippage signal to provide a control signal for controlling the operation of said power transfer mechanism.

14. The device of claim 12 wherein said transducer means is an induction coil.

15. The device of claim 12 wherein said first wave-shaping means is formed of first and second logic NOR gates couples in cascade.

16. The device of claim 12 wherein said filter means is comprised of an RC filter network.

17. The device of claim 13 wherein said logic means includes a logic flip-flop having a toggle input and an output, said logic means also including a logic AND gate having two inputs and an output, said slippage signal being coupled to said toggle input, when said slippage signal is present, said flip-flop toggles to provide an output signal at the output of said flip-flop, when said slippage signal is absent, said flip-flop being toggled to remove the output signal from the output of said flip-flop, the output of said flip-flop being coupled to one of said inputs of said AND gate, the other input of said AND gate being coupled to a thermostat signal, said AND gate providing said control signal at the output of said AND gate only when said slippage signal is absent and said thermostat signal is present.

* * * * *